US00RE41782E

(19) United States
(12) Reissued Patent
Fukuda

(10) Patent Number: US RE41,782 E
(45) Date of Reissued Patent: Sep. 28, 2010

(54) ELECTRICALLY OPERATED DERAILLEUR WITH POWER STORING MECHANISM

(75) Inventor: Masahiko Fukuda, Amagasaki (JP)

(73) Assignee: Shimano, Inc., Sakai-ku, Sakai, Osaka (JP)

(21) Appl. No.: 12/032,861

(22) Filed: Feb. 18, 2008

Related U.S. Patent Documents

Reissue of:
(64) Patent No.: 6,997,835
Issued: Feb. 14, 2006
Appl. No.: 10/305,629
Filed: Nov. 26, 2002

(51) Int. Cl.
*F16H 63/04* (2006.01)
*B62M 9/12* (2006.01)

(52) U.S. Cl. ..... 474/82; 474/80
(58) Field of Classification Search ..... 474/69–70, 474/78, 80–82; 280/259–260
See application file for complete search history.

(56) References Cited

U.S. PATENT DOCUMENTS 2,839,939 A * 6/1958 Juy ..... 474/80
3,919,891 A * 11/1975 Stuhlmuller et al.
3,974,707 A * 8/1976 Nagano ..... 474/82
4,132,119 A 1/1979 Nagano et al.
4,185,510 A * 1/1980 Juy ..... 474/82
4,437,848 A * 3/1984 Shimano ..... 474/82
4,507,101 A 3/1985 Nagano
4,552,546 A * 11/1985 Ishikawa ..... 474/82
4,734,084 A * 3/1988 Nagano
4,861,320 A * 8/1989 Nagano
4,894,046 A * 1/1990 Browning ..... 474/78
4,946,425 A * 8/1990 Buhlmann
5,328,414 A 7/1994 Ancarani Restelli
5,359,884 A * 11/1994 Fey et al.
5,470,277 A * 11/1995 Romano
5,480,356 A * 1/1996 Campagnolo
5,494,307 A * 2/1996 Anderson ..... 280/236
5,518,456 A * 5/1996 Kojima et al.
5,569,104 A * 10/1996 Bellio et al. ..... 474/70
5,860,880 A 1/1999 Oka
6,162,140 A * 12/2000 Fukuda
6,623,389 B1 * 9/2003 Campagnolo ..... 474/80
7,290,458 B2 * 11/2007 Fukuda ..... 474/82

FOREIGN PATENT DOCUMENTS

EP 0543452 A1 5/1993
FR 2587079 A1 * 3/1987

OTHER PUBLICATIONS

European search report dated Feb. 22, 2007, for EP 03026278.2, the European application that corresponds to U.S. Appl. No. 10/305,629, now US patent 6,997,835 B2.

* cited by examiner

*Primary Examiner*—Marcus Charles
(74) *Attorney, Agent, or Firm*—James A. Deland

(57) ABSTRACT

A rear derailleur for a bicycle includes a base member for attaching the rear derailleur to the bicycle, a movable member for supporting a chain guide, and a linkage mechanism coupling the base member to the movable member so that the movable member is capable of movement relative to the base member. An electrically operated actuating member is operatively coupled to the linkage mechanism, wherein moving the actuating member in a first direction causes the movable member to move laterally toward a rear wheel of the bicycle, and moving the actuating member in a second direction causes the movable member to move laterally away from the rear wheel of the bicycle. A power storing mechanism is disposed in a power transmission path between the actuating member and the movable member for storing relative forces applied between the actuating member and the movable member.

23 Claims, 11 Drawing Sheets

ELECTRICALLY OPERATED DERAILLEUR WITH POWER STORING MECHANISM

Matter enclosed in heavy brackets [ ] appears in the original patent but forms no part of this reissue specification; matter printed in italics indicates the additions made by reissue.

BACKGROUND OF THE INVENTION

The present invention is directed to bicycles and, more particularly, to various features of an electrically operated bicycle derailleur.

Derailleur operated bicycle transmissions typically comprise a plurality of sprockets that rotate with another rotating member (e.g., the front crank and/or the rear wheel of the bicycle) and a derailleur that is used to shift a chain among the plurality of sprockets. Conventional derailleurs comprise a base member adapted to be mounted to the bicycle frame, a movable member supporting a chain guide, and a linkage mechanism coupled between the base member and the movable member so that the movable member can move laterally inwardly and outwardly relative to the base member. Such derailleurs are manually controlled by a hand operated actuator such as a lever or twist-grip attached to the bicycle handlebar, wherein the derailleur is connected to the actuator by a bowden cable.

Recently, various electronic devices have been used to control the movement of the derailleur. Such devices sometimes comprise a traveling condition detector for detecting a traveling condition of the bicycle, a motor for moving the derailleur laterally inwardly and outwardly relative to the plurality of sprockets, and a processor. The processor controls the motor in response to the detected traveling condition so that the derailleur is in the proper position to maintain the traveling condition within a desired range.

The motor used to move the derailleur typically moves the derailleur laterally inwardly and/or laterally outwardly by moving an actuating member such as an actuating arm or a pivot shaft attached to the linkage mechanism. Unfortunately, sometimes the movable member experiences significant resistance to lateral movement, especially when the plurality of sprockets are stationary, and this resistance is communicated to the actuating member. Since the motor may be unable to move the actuating member in such a situation, there is a risk of damage to the motor. Another problem is that an external force may be applied to the movable member such as a force directed toward the wheel when the bicycle lays or falls down, or a force directed away from the wheel if the derailleur catches some external object. Such external forces also may be communicated to the actuating member, thus again risking damage to the motor.

SUMMARY OF THE INVENTION

The present invention is directed to various features of an electrically operated bicycle derailleur. In one embodiment of the present invention, a derailleur for a bicycle includes a base member for attaching the derailleur to the bicycle, a movable member for supporting a chain guide, and a linkage mechanism coupling the base member to the movable member so that the movable member is capable of movement relative to the base member. An electrically operated actuating member is operatively coupled to the linkage mechanism, wherein moving the actuating member in a first direction causes the movable member to move laterally toward the bicycle, and moving the actuating member in a second direction causes the movable member to move laterally away from the bicycle. A power storing mechanism is disposed in a power transmission path between the actuating member and the movable member for storing relative forces applied between the actuating member and the movable member. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
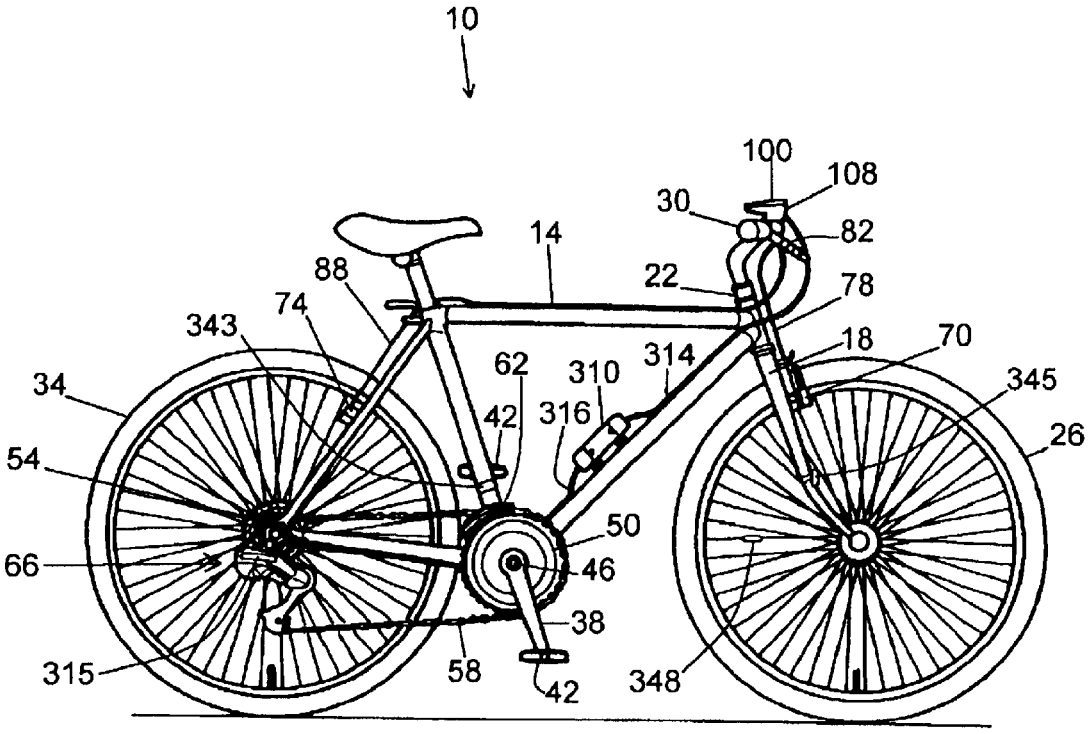
FIG. 1 is a side view of a bicycle that includes a particular embodiment of an electronically controlled bicycle transmission.
Figure 2:
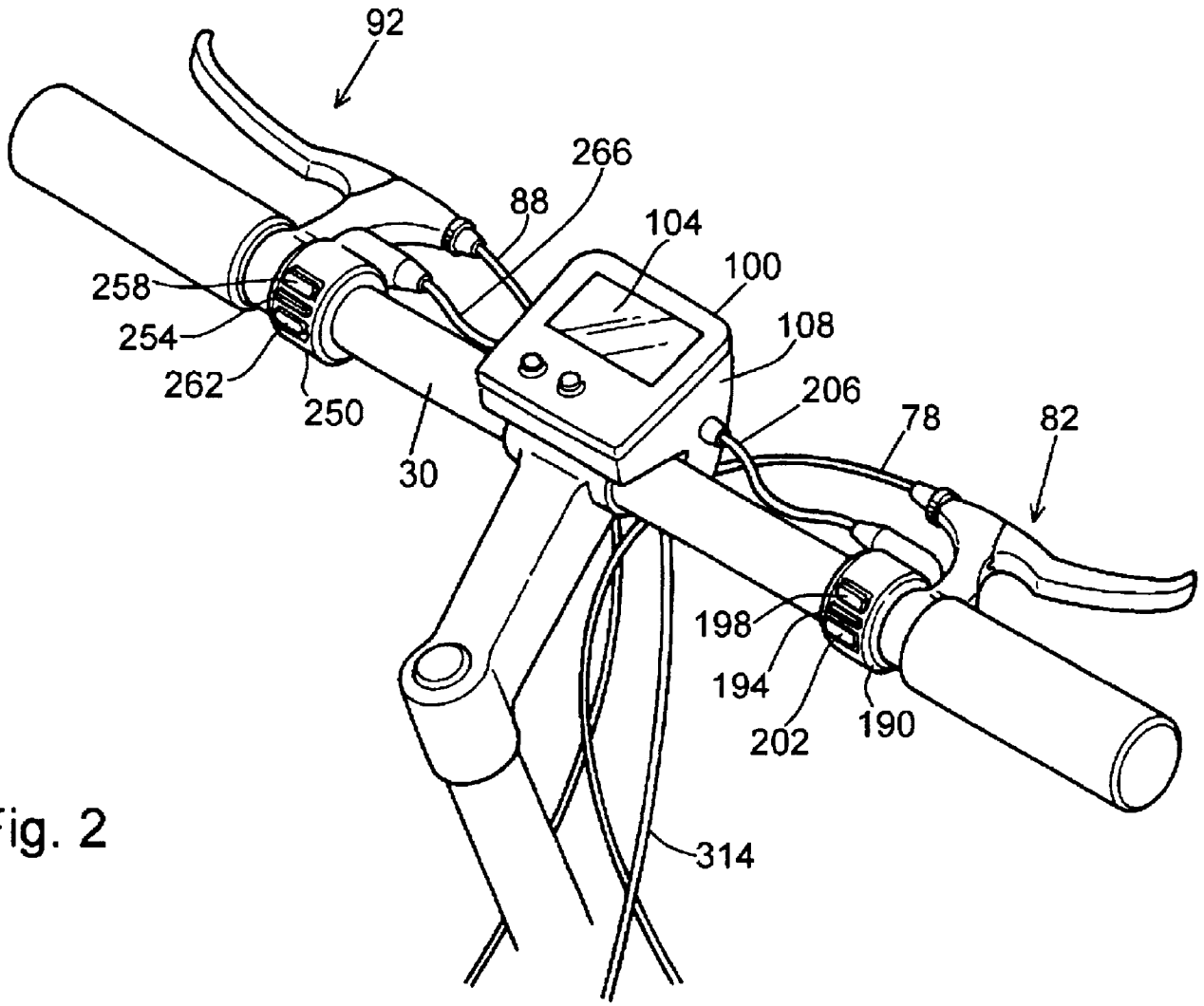
FIG. 2 is an oblique view of the handlebar mounted components of the electronically controlled bicycled transmission.

FIG. 1 is a side view of a bicycle 10 that includes a particular embodiment of an electronically controlled bicycle transmission. Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of front sprockets 50 are mounted to the right side crank arm 38 for rotating with the right side crank arm 38, and a sprocket unit 54 comprising a plurality of rear sprockets 54a–54g (FIG. 3) are mounted to the rear wheel 34 for rotating with rear wheel 34. A chain 58 engages one of the plurality of front sprockets 50 and one of the plurality of rear sprockets 54a–54g. A front derailleur 62 is mounted to frame 14 in close proximity to the plurality of front sprockets 50 for moving chain 58 among the plurality of front sprockets 50, and a rear derailleur 66 is mounted to frame 14 in close proximity to the sprocket unit 50 for moving chain 58 among the plurality of rear sprockets 54a–54g. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 that is connected to a brake lever assembly 82 mounted on the right side of handlebar 30 as shown in FIG. 2. Similarly, rear braking unit 74 is connected to a Bowden-type control cable 88 that is connected to a brake lever assembly 92 mounted on the left side of handlebar 30.

As shown in FIGS. 1–2, a display housing 100 having an LCD display 104 is coupled to a mounting bracket 108 attached to handlebar 30. A right switch housing 190 containing a mode switch 194, a rear derailleur upshift switch 198, and a rear derailleur downshift switch 202 is mounted to the right side of handlebar 30. Similarly, a left switch housing 250 containing a mode switch 254, a front derailleur upshift switch 258, and a front derailleur downshift switch 262 is mounted to the left side of handlebar 30. The components disposed in right switch housing 190 are coupled to the components in display housing 100 through a communication path 206, and the components disposed in left switch housing 250 are coupled to the components in display housing 100 through a communication path 266. Mode switches 194 and 254 may be used to switch between a manual shifting mode and one or more automatic shifting modes, to change the information displayed on display 104, and so on. A main derailleur control unit 310 is mounted to frame 14, and it is electrically coupled to mounting bracket 108 through an intermediate communication path 314. A rear derailleur control housing 315 is mounted to rear derailleur 66, and it is electrically coupled to main derailleur control unit 310 through an intermediate communication path 316. A crank rotation sensor 343 is provided for sensing signals from a magnet (not shown) coupled to the left side crank arm 38 to determine the rate of rotation of crank arms 38 in a known manner, and a wheel rotation sensor 345 is provided for sensing signals from a magnet 348 mounted to front wheel 26 to determine the speed of the bicycle in a known manner. Crank rotation sensor 343 and wheel rotation sensor 345 are coupled to main derailleur control unit 310 through separate communication paths (not shown).

Figure 3:
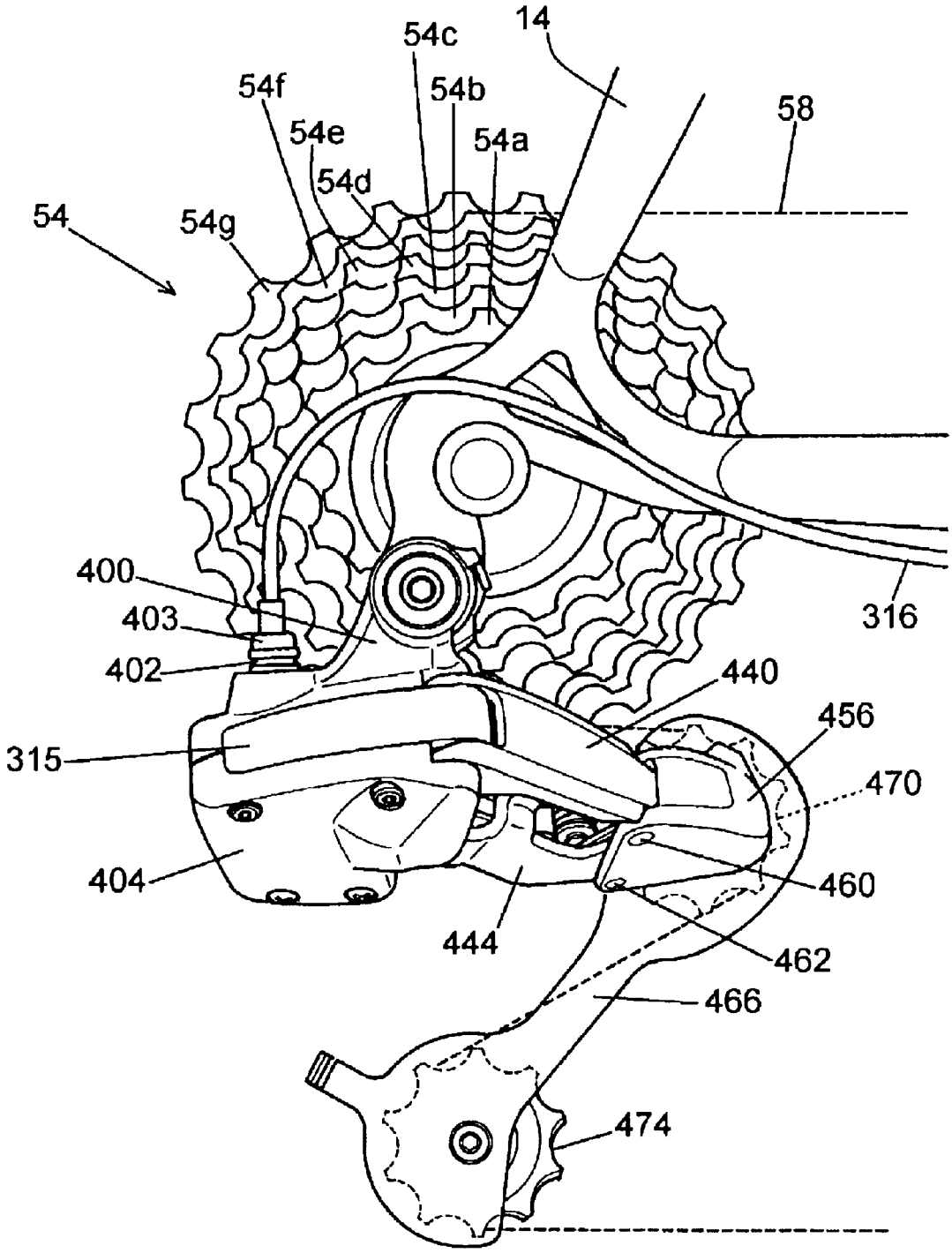
FIG. 3 is a closer view of the rear derailleur and sprocket assembly shown in FIG. 1.
Figure 4:
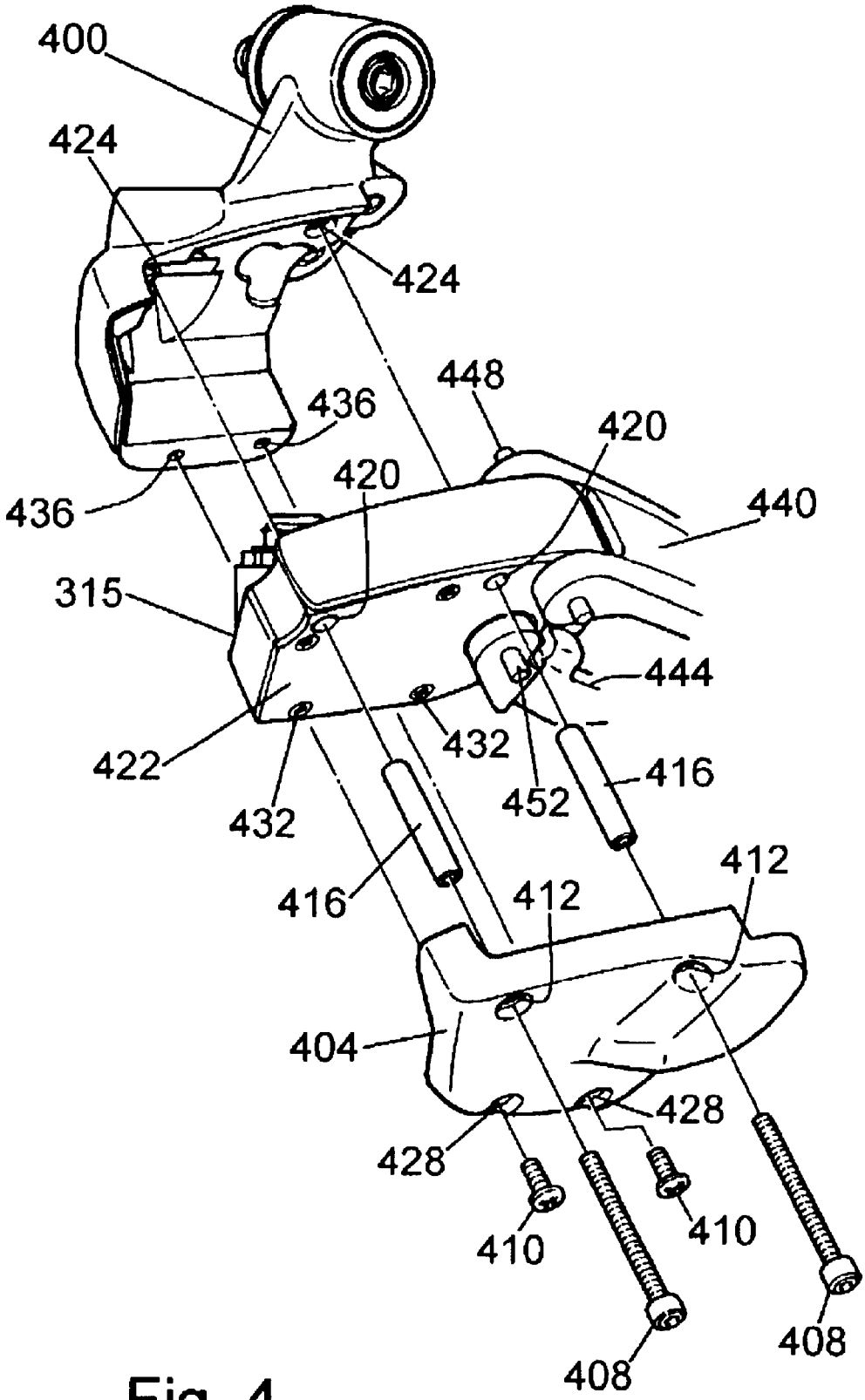
FIG. 4 is a partially exploded view of the derailleur shown in FIG. 3.

As shown in FIGS. 3 and 4, rear derailleur control housing 315 is mounted between a base member 400 and an outer cover 404 of rear derailleur 66. Base member 400 is swingably mounted to frame 14 in a known manner, and it includes an electrical connector 402 for connecting to a complementary connector 403 on intermediate communication path 316. As shown in FIG. 4, outer cover 404 and rear derailleur control housing 315 are mounted to base member 400 by screws 408 and 410. Screws 408 extend through openings 412 in outer cover 404, through spacer tubes 416 that extend through openings 420 in a rear derailleur control housing cover 422 and into threaded openings 424 in base member 400. Screws 410 extend through openings 428 in outer cover 404, through openings 432 in rear derailleur control housing cover 422, and into threaded openings 436 in base member 400.

Rear derailleur 66 further comprises a linkage mechanism in the form of link members 440 and 444 pivotably coupled to rear derailleur control housing 315 through respective pivot shafts 448 and 452. The other ends of link members 440 and 444 are pivotably coupled to a movable member 456 through respective pivot shafts 460 and 462. Movable member 456 rotatably supports a chain guide 466 which, in turn, rotatably supports a guide pulley 470 and a tension pulley 474 for engaging chain 58 in a known manner. As discussed in more detail below, a motor 480 (FIG. 5) rotates pivot shaft 452 for causing link member 444 to move movable member 456 and chain guide 466 laterally for transferring chain 58 among the plurality of rear sprockets 54a-54g.

Figure 5:
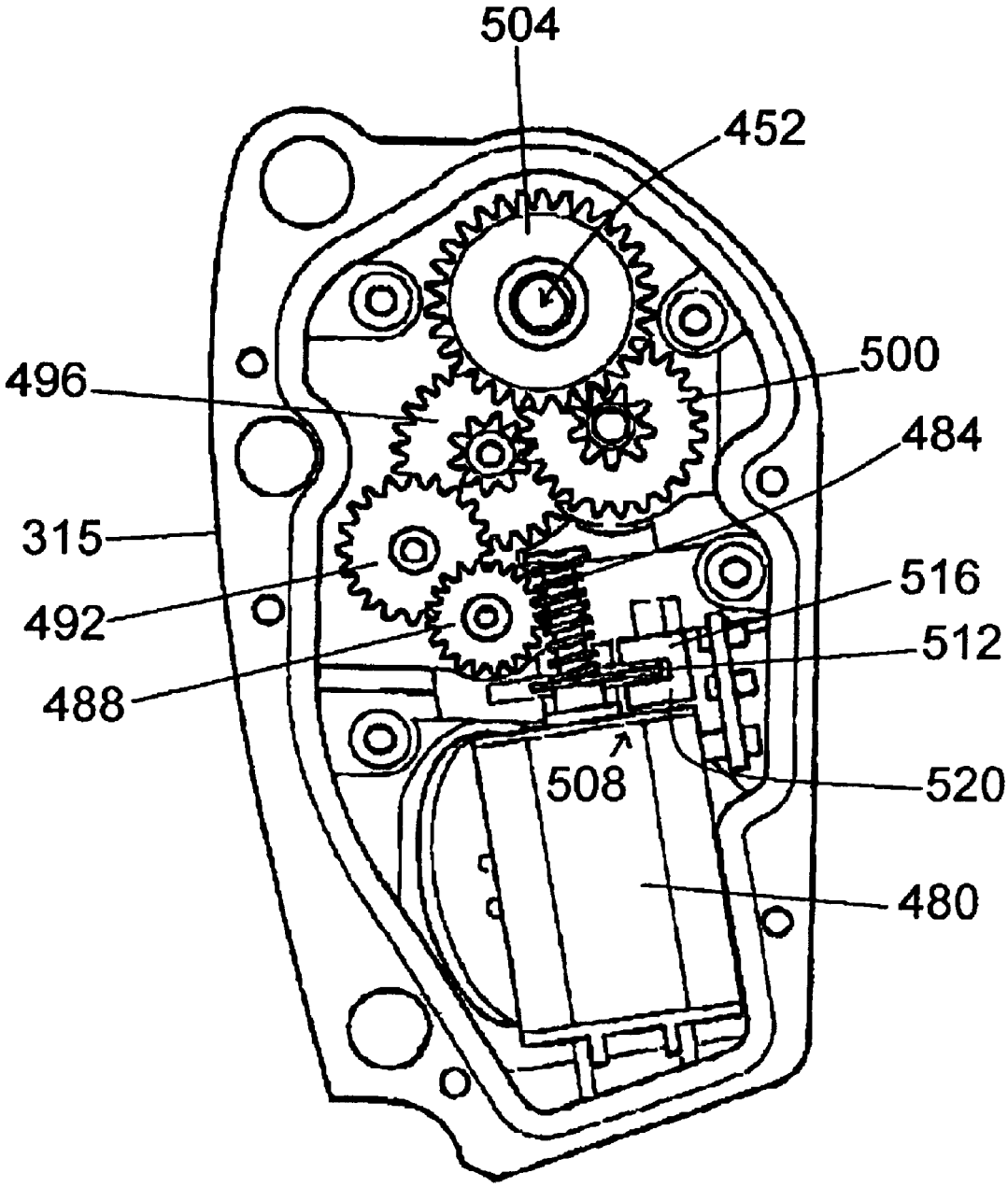
FIG. 5 is a view of the rear derailleur control housing illustrating a particular embodiment of a motor drive mechanism.

FIG. 5 is a view illustrating the contents of rear derailleur control housing 315 with rear derailleur control housing cover 422 removed. As shown in FIG. 5, motor 480 includes a pinion drive shaft 484 that drives pivot shaft 452 through a gear reduction mechanism comprising gears 488, 492, 496, 500 and 504, wherein a small diameter gear portion of each gear 488, 492, 496 and 500 drives a larger diameter gear portion of the next gear in the power transmission path. Gear 504 rotates integrally with pivot shaft 452. A digital signal providing mechanism in the form of a digital position sensor 508 is mounted in rear derailleur control housing 315. Digital position sensor 508 includes a shutter wheel 512 that rotates integrally with pinion drive shaft 484, a light source such as an LED 516 disposed on one side of shutter wheel 512, and a light detector such as a phototransistor 520 disposed on the other side of shutter wheel 512. Rotation of shutter wheel 512 with pinion drive shaft 484 causes the passage of light from LED 516 to phototransistor 520 to be intermittently blocked, thus producing a digital signal having a period determined by the rate of rotation of shutter wheel 512.

Figure 6:
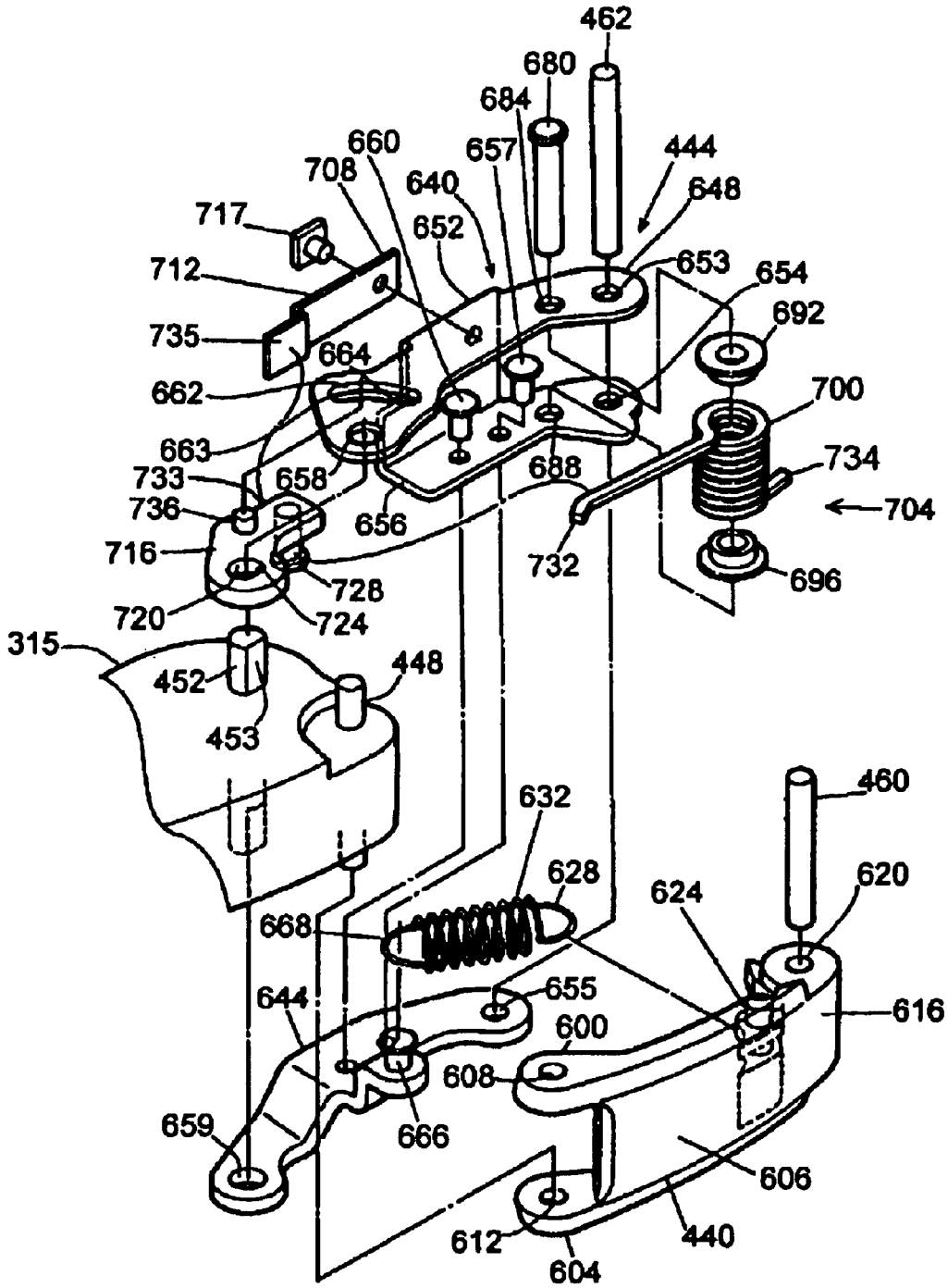
FIG. 6 is an exploded view of the linkage mechanism and the power storing mechanism of the derailleur shown in FIG. 3.

FIG. 6 is an exploded view of the linkage mechanism and a power storage mechanism for rear derailleur 66. In this embodiment, link member 440 includes spaced apart mounting ears 600 and 604 extending from one end of a side wall 606, and a mounting cylinder 616 extending from an opposite end of side wall 606. Mounting ears 600 and 604 have respective openings 608 and 612 for receiving pivot shaft 448 therethrough, and mounting cylinder 616 has an opening 620 for receiving pivot shaft 460 therethrough. A spring hooking member 624 is disposed on the inner side of side wall 606 in close proximity to mounting cylinder 616 for retaining a first end 628 of a coil spring 632.

Link member 444 includes a first link plate 640 and a second link plate 644. First link plate 644 has a generally U-shape formed by an upper wall 648, a side wall 652 and a bottom wall 656, wherein bottom wall 656 is fastened to second link plate 644 through rivets 657. Generally circular openings 658 and 659 are formed on one end of upper wall 648 of first link plate 640 and on one end of second link plate 644, wherein circular openings 658 and 659 receive pivot shaft 452 therethrough such that first link plate 640 and second link plate 644 can rotate around pivot shaft 452. Similarly, respective openings 653 and 654 are formed on the opposite ends of upper wall 648 and lower wall 656 of first link plate 640, and another opening 655 is formed on the opposite end of second link plate 644, wherein openings 653, 654 and 655 receive pivot shaft 462 therethrough. An arcuate slot 662 forming link member abutments 663 and 664 is formed in close proximity to opening 658 in upper wall 648 for reasons discussed below.

A spring hooking member 666 is disposed at an intermediate portion of second link plate 644 for retaining a second end 668 of spring 632. Spring 632 functions to take up the play in the gear reduction mechanism in rear derailleur control housing 315. A spring shaft 680 extends through respective openings 684 and 688 in upper wall 648 and bottom wall 656 of first link plate 640, through upper and lower bushings 692 and 696, and through the coiled section 700 of a coil spring 704 disposed between bushings 692 and 696. Coil spring 704 has a first end 732 and a second end 734, wherein the second end 734 of spring 704 abuts against pivot shaft 462. A first end 708 of an elongated leaf spring 712 is fastened to the outer side of side wall 652 of first link plate 640 through a rivet 717. In this embodiment, the spring constant of spring 712 is greater than the spring constant of spring 704, and the spring constant of spring 704 is greater than the spring constant of spring 632. That is because, in this embodiment, spring 712 is used to store power when movable member 456 moves in the downshifting direction (wherein normal resistance already is significant), spring 704 is used to store power when movable member 456 moves in the upshifting direction (wherein normal resistance already is relatively small, and spring 632 merely takes up the play in the gear reduction mechanism in rear derailleur control housing 315.

An actuating arm 716 has an opening 720 formed on a proximal end thereof for receiving pivot shaft 452 therethrough. Opening 720 includes a flat 724 for engaging flat 453 on pivot shaft 452 so that actuating arm 716 is nonrotatably fixed relative to pivot shaft 452. A first spring abutment 728 in the form of a post projects downwardly from a distal end of actuating arm 716 for abutting against first end 732 of spring 704, and a second spring abutment 733 is disposed at the distal end of actuating arm 716 for abutting against a second end 735 of leaf spring 712. An actuating member abutment in the form of a motion limiting post 736 extends upwardly from actuating arm 716 into slot 662 in upper wall 648 of first link pate 444 when derailleur 66 is in the assembled state.

Figure 7:
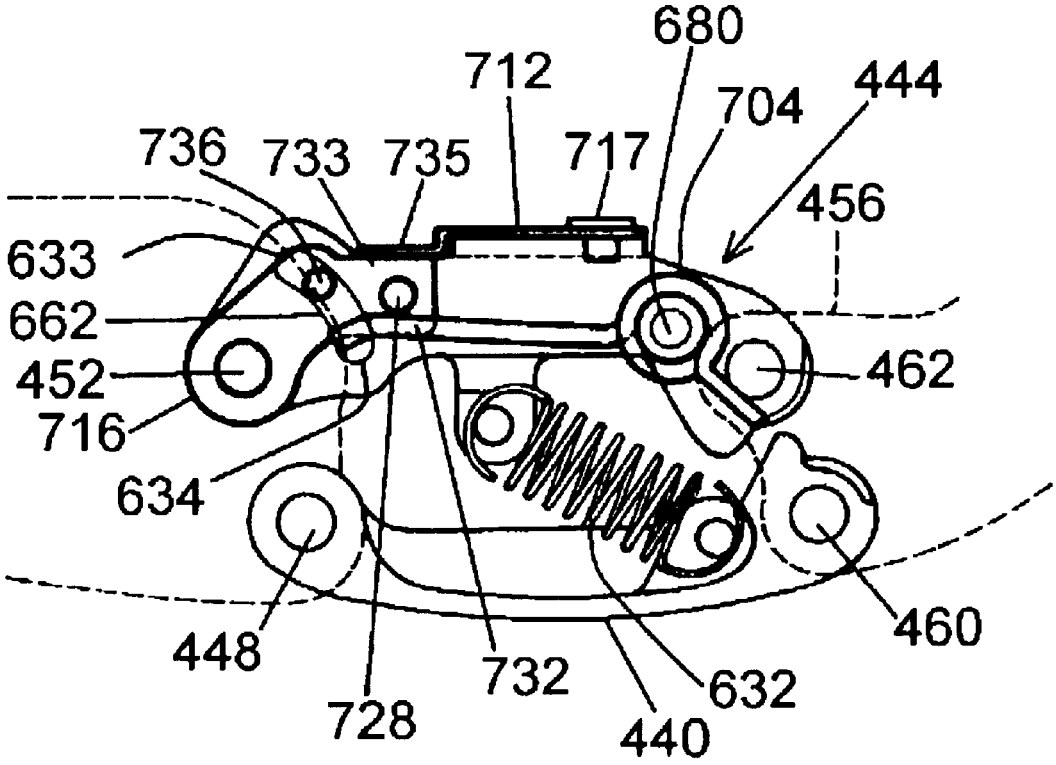
FIG. 7 is a view of the linkage mechanism and the power storing mechanism in a neutral state.

FIG. 7 is a view of link members 440 and 444, springs 704 and 712, and actuating arm 716 in a neutral state. In this state, the distal end of actuating arm 716 is sandwiched between the first end 732 of spring 704 and the second end of 735 of spring 712 by virtue of first spring abutment 728 and second spring abutment 733, and motion limiting post 736 is spaced apart from link member abutments 663 and 664. Assume movable member 456 does not experience an excessive amount of resistance to lateral movement. In this case, when pivot shaft 452 and actuating arm 716 rotate clockwise, then first spring abutment 728 on actuating arm 716 presses against the first end 732 of spring 704, the force is transmitted to link member 444 through spring shaft 680, link members 440 and 444 rotate clockwise around their respective pivot shafts 448 and 452, and movable member 456 moves accordingly. Similarly, when pivot shaft 452 rotates counterclockwise, then the second spring abutment 733 on the distal end of actuating arm 716 presses against the second end 735 of spring 712, the force is transmitted to link member 444 through rivet 717, link members 440 and 444 rotate counterclockwise around their respective pivot shafts 448 and 452, and movable member 456 moves accordingly.

Figure 8:
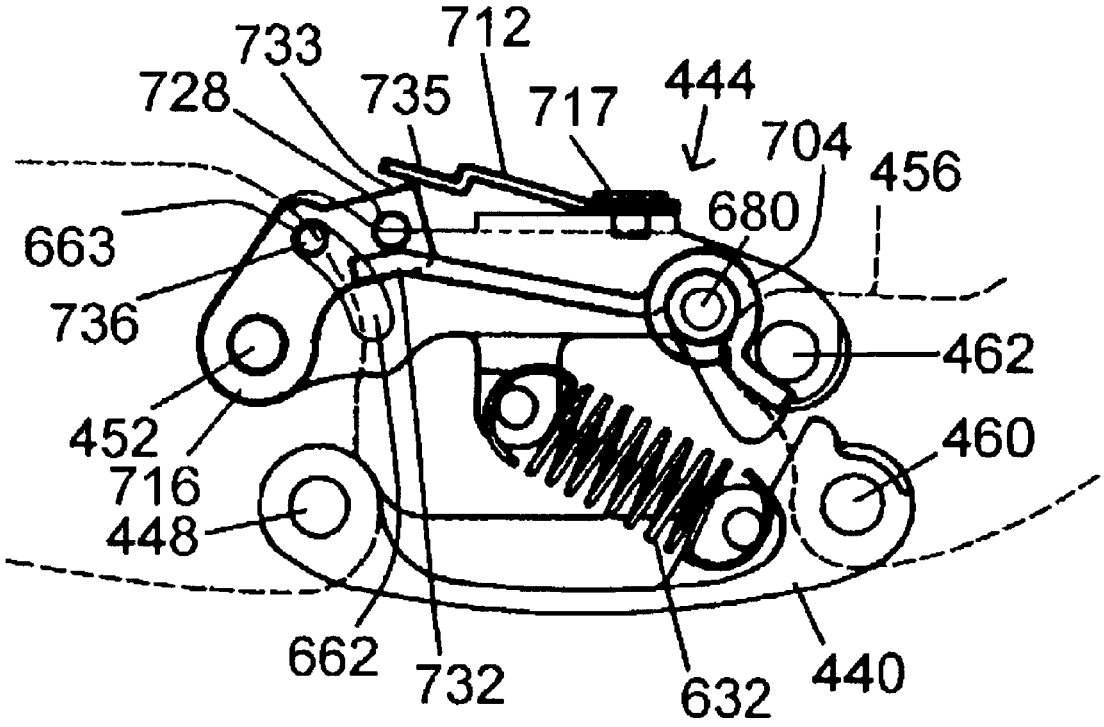
FIG. 8 is a view of the linkage mechanism and the power storing mechanism in a power storing state when a force is applied from the actuating member toward the movable member in a first direction.

FIG. 8 shows the operation of rear derailleur 66 when movable member 456 experiences an excessive amount of resistance to movement toward the wheel (upwardly in FIG. 8). In general, the power transmission path when actuating arm 716 rotates counterclockwise is second spring abutment 733 of actuating arm 716→second end 735 of spring 712→rivet 717→1ink member 444→pivot shaft 462→movable member 456. Thus, spring 712 is in the power transmission path between actuating arm 716 and movable member 456 when actuating arm 716 rotates counterclockwise. More specifically, when pivot shaft 452 rotates counterclockwise, then the second spring abutment 733 on actuating arm 716 presses against the second end 735 of spring 712, the force is transmitted to link member 444 through rivet 717, but link members 440 and 444 cannot significantly rotate counterclockwise around pivot shafts 448 and 452 because movable member 456 experiences excessive resistance. In this case, the second end 735 of spring 712 moves upwardly relative to link member 444 as shown in FIG. 8 to save the power until the resistance is removed from movable member 456. In this embodiment, the counterclockwise rotation of actuating arm 716 relative to link member 444 may be limited by contact between motion limiting post 736 and abutment 663 in slot 662 to ensure that actuating arm 716 does not become disengaged from spring 712. When the resistance is removed from movable member 456, then movable member 456 moves toward the wheel (upwardly in FIG. 8), and link members 440 and 444 rotate counterclockwise around their respective pivot shafts 448 and 452 until the distal end of actuating arm 716 again is sandwiched between the second end 732 of spring 704 and the second end 735 of spring 712.

Figure 9:
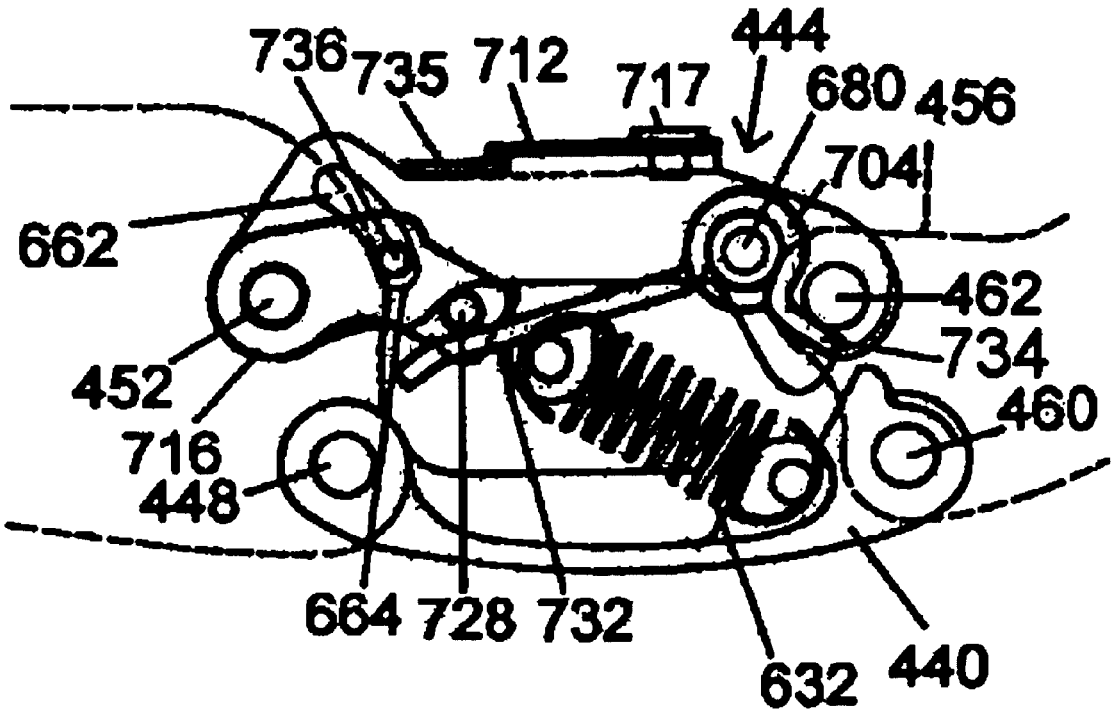
FIG. 9 is a view of the linkage mechanism and the power storing mechanism in a power storing state when a force is applied from the actuating member toward the movable member in a second direction.

FIG. 9 shows the operation of rear derailleur 66 when movable member 456 experiences an excessive amount of resistance to movement away from the wheel (downwardly in FIG. 9). In general, the power transmission path when actuating arm 716 rotates clockwise is first spring abutment 728 of actuating arm 716→first end 732 of spring 704→spring shaft 680→link member 444→pivot shaft 462→movable member 456. Thus, spring 704 is in the power transmission path between actuating arm 716 and movable member 456 when actuating arm 716 rotates clockwise. More specifically, when pivot shaft 452 rotates clockwise, then the first spring abutment 728 on actuating arm 716 presses against the first end 732 of spring 704 and the force is transmitted to link member 444 through spring shaft 680, but link members 440 and 444 cannot significantly rotate clockwise around their respective pivot shafts 448 and 452 because movable member 456 experiences such excessive resistance. In this case, first end 732 of spring 704 moves counterclockwise to coil spring 704 around spring shaft 680 while the second end 734 of spring 704 abuts against pivot shaft 462 as shown in FIG. 9 to save the power until the resistance is removed from movable member 456. In this case, the rotation of actuating arm 716 relative to link member 444 may be limited by contact between motion limiting post 736 and abutment 664 in slot 662 to ensure that actuating arm 716 does not become disengaged from spring 704. When the resistance is removed from movable member 456, then movable member 456 moves away from the wheel (downwardly in FIG. 9), and link members 440 and 444 rotate clockwise around their respective pivot shafts 448 and 452 until the distal end of actuating arm 716 again is sandwiched between the first end 732 of spring 704 and the second end 735 of spring 712.

Figure 10:
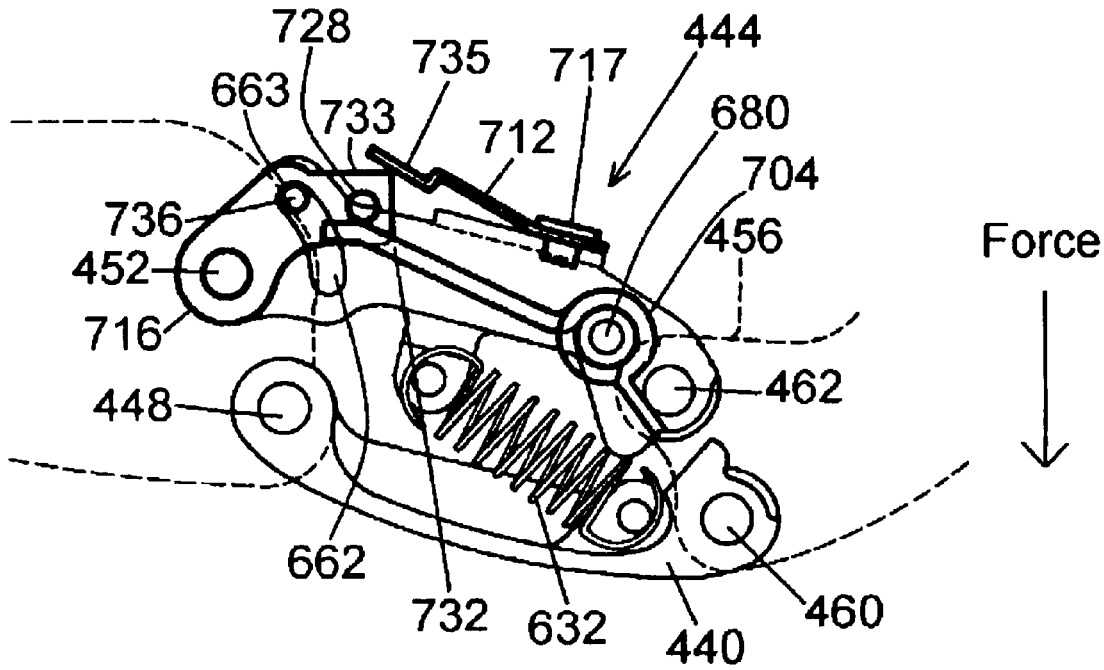
FIG. 10 is a view of the linkage mechanism and the power storing mechanism in a power storing state when an external force is applied to the movable member in a direction away from the rear wheel.

FIG. 10 shows the operation of rear derailleur 66 when an external force is applied to the movable member 456 in a direction away from the rear wheel (downwardly in FIG. 10). In general, the power transmission path when an external force is applied to movable member 456 downwardly in FIG. 10 is movable member 456→pivot shaft 462→link member 444→rivet 717→spring 712→second end 735 of spring 712→second spring abutment 733 of actuating arm 716. Thus, spring 712 is in the power transmission path between actuating member 716 and movable member 456 when actuating member 716 moves downwardly in FIG. 10. More specifically, when movable member 456 moves away from the wheel, then link members 440 and 444 rotate in a clockwise direction around their respective pivot shafts 448 and 452. However, actuating arm 716 cannot significantly rotate clockwise because it is nonrotatably fixed to pivot shaft 452. To avoid damaging motor 480, the second spring abutment 733 on actuating arm 716 presses against the second end 735 of spring 712 so that the second end 735 of spring 712 moves upwardly relative to link member 444 as shown in FIG. 10 to save the power until the external force is removed from movable member 456. As noted above, the clockwise rotation of link member 444 relative to actuating arm 716 may be limited by contact between motion limiting post 736 and abutment 663 in slot 662 to ensure that actuating arm 716 does not become disengaged from spring 712. When the external force is removed from movable member 456, then movable member 456 moves toward the wheel (upwardly in FIG. 10) to its appropriate position, and link members 440 and 444 rotate counterclockwise around their respective pivot shafts 448 and 452 until the distal end of actuating arm 716 again is sandwiched between the second end 732 of spring 704 and the second end 735 of spring 712.

Figure 11:
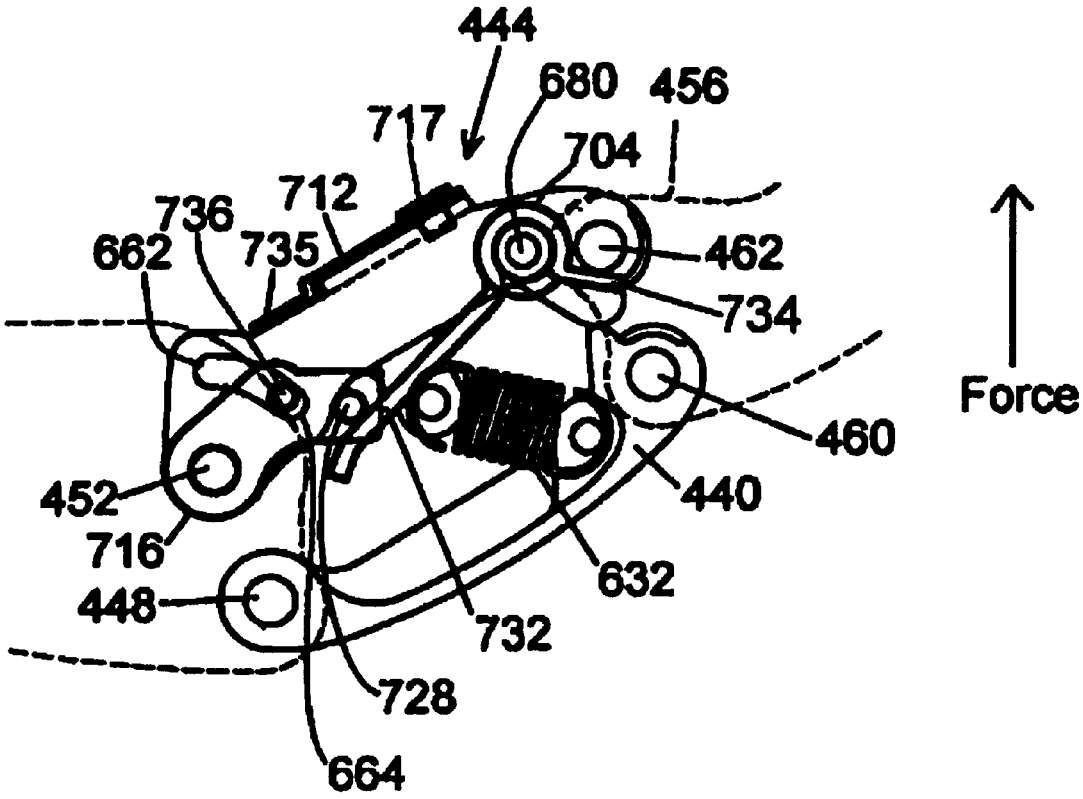
FIG. 11 is a view of the linkage mechanism and the power storing mechanism in a power storing state when an external force is applied to the movable member in a direction toward the rear wheel.

FIG. 11 shows the operation of rear derailleur 66 when an external force is applied to the movable member 456 in a direction toward the rear wheel (upwardly in FIG. 11). In general, the power transmission path when movable member 462 moves upwardly in FIG. 11 is movable member 456→pivot shaft 462→link member 444→spring shaft 680→first end 732 of spring 704→first spring abutment 728 of actuating arm 716. Thus, spring 704 is in the power transmission path between actuating arm 716 and movable member 456 when movable member 456 moves upwardly in FIG. 11. More specifically, when movable member 456 moves toward the wheel, then link members 440 and 444 rotate in a counterclockwise direction around their respective pivot shafts 448 and 452. However, actuating arm 716 cannot significantly rotate counterclockwise because it is nonrotatably fixed to pivot shaft 452. To avoid damaging motor 480, the first spring abutment 728 on actuating arm 716 presses against the first end 732 of spring 704, the first end 732 of spring 704 moves counterclockwise to coil spring 704 around spring shaft 680, and the second end 734 of spring 704 abuts against pivot shaft 462 as shown in FIG. 11 to save the power until the external force is removed from movable member 456. As noted previously, the counterclockwise rotation of link member 444 relative to actuating arm 716 may be limited by contact between motion limiting post 736 and abutment 664 in slot 662 to ensure that actuating arm 716 does not become disengaged from spring 704. When the external force is removed from movable member 456, then movable member 456 moves away from the wheel (downwardly in FIG. 11) to its appropriate position, and link members 440 and 444 rotate clockwise around their respective pivot shafts 448 and 452 until the distal end of actuating arm 716 again is sandwiched between the second end 732 of spring 704 and the second end 735 of spring 712.

While the above is a description of various embodiments of inventive features, further modifications may be employed without departing from the spirit and scope of the present invention. For example, the gear mechanism within rear derailleur housing may be omitted, and motor 480 may operate actuating arm 716 through a cable. The teachings herein may be applied to a front derailleur. The springs 704 and 712 need not be coil springs or leaf springs, and they may constitute any number of biasing elements.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A derailleur for a bicycle comprising:

a base member for attaching the derailleur to the bicycle;

a movable member for supporting a chain guide;

a linkage mechanism coupling the base member to the movable member so that the movable member is capable of movement relative to the base member;

*wherein the linkage mechanism is moved by rotating a pivot shaft;* an electrically operated actuating member operatively coupled to the linkage mechanism, wherein moving the actuating member in a first direction causes the movable member to move laterally toward the bicycle and moving the actuating member in a second direction causes the movable member to move laterally away from the bicycle; and a power storing mechanism disposed in a first power transmission path and in a different second power transmission path between the actuating member and the movable member for storing forces directed from the actuating member toward the movable member in a first force direction along the first power transmission path and from the actuating member toward the movable member in a second force direction along the second power transmission path, wherein the first force direction is different from the second force direction;

*wherein the power storing mechanism is disposed in at least one of the first power transmission path or the second power transmission path downstream of the pivot shaft from the pivot shaft toward the movable member when the pivot shaft is rotated.*

2. The derailleur according to claim 1 wherein the power storing mechanism comprises a biasing element disposed in the first power transmission path between the actuating member and the movable member for storing motive power of the actuating member in the first force direction.

3. The derailleur according to claim 1 wherein the power storing mechanism comprises a biasing element disposed in the second power transmission path between the actuating member and the movable member for storing motive power of the actuating member in the second force direction.

4. The derailleur according to claim 1 wherein the linkage mechanism comprises a link member having a first end coupled to one of the base member and the movable member and a second end coupled to the other one of the base member and the movable member.

5. The derailleur according to claim 4 wherein the first end of the link member is rotatably coupled to the one of the base member and the movable member.

6. A derailleur for a bicycle comprising:

a base member for attaching the derailleur to the bicycle;

a movable member for supporting a chain guide;

a linkage mechanism coupling the base member to the movable member so that the movable member is capable of movement relative to the base member;

*wherein the linkage mechanism is moved by rotating a pivot shaft;* an electrically operated actuating member operatively coupled to the linkage mechanism, wherein moving the actuating member in a first direction causes the movable member to move laterally toward the bicycle and moving the actuating member in a second direction causes the movable member to move laterally away from the bicycle; and a power storing mechanism disposed in a first power transmission path and in a different second power transmission path between the actuating member and the movable member for storing relative forces applied between the actuating member and the movable member, wherein the power storing mechanism comprises:

a first biasing element disposed in the first power transmission path between the actuating member and the movable member for storing relative forces applied between the actuating member and the movable member; and a second biasing element disposed in the second power transmission path between the actuating member and the movable member for storing relative forces applied between the actuating member and the movable member;

*wherein the first biasing element is disposed in the first power transmission path downstream of the pivot shaft from the pivot shaft toward the movable member when the pivot shaft is rotated.*

7. The derailleur according to claim 6 wherein the actuating member is disposed between the first biasing element and the second biasing element.

8. A derailleur for a bicycle comprising:

a base member for attaching the derailleur to the bicycle;

a movable member for supporting a chain guide;

a linkage mechanism coupling the base member to the movable member so that the movable member is capable of movement relative to the base member;

wherein the linkage mechanism comprises a link member having a first end rotatably coupled to one of the base member and the movable member and a second end coupled to the other one of the base member and the movable member;

an electrically operated actuating member operatively coupled to the linkage mechanism, wherein moving the actuating member in a first direction causes the movable member to move laterally toward the bicycle and moving the actuating member in a second direction causes the movable member to move laterally away from the bicycle; and a power storing mechanism disposed in a first power transmission path and in a different second power transmission path between the actuating member and the movable member for storing relative forces applied between the actuating member and the movable member, wherein the power storing mechanism comprises:

a first biasing element disposed in the first power transmission path between the actuating member and the movable member for storing relative forces applied between the actuating member and the movable member; and a second biasing element disposed in the second power transmission path between the actuating member and the movable member for storing relative forces applied between the actuating member and the movable member;

*wherein the first biasing element comprises a first spring having a first portion that engages the link member and a second portion that engages the actuating member; and*

*wherein the second biasing element comprises a second spring having a first portion that engages the link member and a second portion that engages the actuating member.*

9. The derailleur according to claim 8 wherein the actuating member is disposed between the first biasing element and the second biasing element.

[10. The derailleur according to claim 9 wherein the first biasing element comprises a first spring having a first end that engages the link member and a second end that engages the actuating member, and wherein the second biasing element comprises a second spring having a first end that engages the link member and a second end that engages the actuating member.]

11. The derailleur according to claim [10] *8* wherein the actuating member has a first end that rotates coaxially with the first end of the link member.

12. The derailleur according to claim 11 wherein the actuating member has a second end disposed between the second end of the first spring and the second end of the second spring.

13. The derailleur according to claim 12 wherein the first spring has a different spring constant than the second spring.

14. The derailleur according to claim 12 wherein at least one of the first spring and the second spring comprises a leaf spring.

15. The derailleur according to claim 12 wherein at least one of the first spring and the second spring comprises a coil spring.

16. The derailleur according to claim 15 wherein the coil spring has a coiled section that coils around a projection extending from the link member.

17. The derailleur according to claim 12 wherein the actuating member has an actuating member abutment, wherein the link member has a link member abutment, and wherein the actuating member abutment is spaced apart from the link member abutment when the actuating member is in a neutral position relative to the link member.

18. The derailleur according to claim 17 wherein the actuating member abutment contacts the link member abutment when the actuating member is in a selected rotational position relative to the link member.

19. The derailleur according to claim 12 wherein one of the actuating member and the link member has a first abutment, wherein the other one of the actuating member and the link member has a second abutment spaced apart from a third abutment, and wherein the first abutment is spaced apart from the second abutment and the third abutment when the actuating member is in a neutral position relative to the link member.

20. The derailleur according to claim 19 wherein the first abutment contacts the second abutment when the actuating member is in a first selected rotational position relative to the link member in the first direction, and wherein the first abutment contacts the third abutment when the actuating member is in a second selected rotational position relative to the link member in the second direction.

21. A derailleur for a bicycle comprising:

a base member for attaching the derailleur to the bicycle;

a movable member for supporting a chain guide;

a linkage mechanism coupling the base member to the movable member so that the movable member is capable of movement relative to the base member;

*wherein the linkage mechanism is moved by rotating a pivot shaft;* an electrically operated actuating member operatively coupled to the linkage mechanism, wherein moving the actuating member in a first direction causes the movable member to move laterally toward the bicycle and moving the actuating member in a second direction causes the movable member to move laterally away from the bicycle; and a power storing mechanism disposed in a first power transmission path and in a different second power transmission path between the actuating member and the movable member for storing forces directed from the movable member toward the actuating member in a first force direction and from the movable member toward the actuating member in a second force direction, wherein the first force direction is different from the second force direction;

*wherein the power storing mechanism is disposed in at least one of the first power transmission path or the second power transmission path downstream of the pivot shaft from the pivot shaft toward the movable member when the pivot shaft is rotated.*

22. A rear derailleur apparatus for a bicycle comprising:

a base member for attaching the rear derailleur to the bicycle;

a movable member for supporting a chain guide;

a linkage mechanism coupling the base member to the movable member so that the movable member is capable of movement relative to the base member;

*wherein the linkage mechanism is moved by rotating a pivot shaft;* an actuating member operatively coupled to the linkage mechanism, wherein moving the actuating member in a first direction causes the movable member to move laterally toward a rear wheel of the bicycle and moving the actuating member in a second direction causes the movable member to move laterally away from the rear wheel of the bicycle;

a motor that electrically drives the actuating member in the first direction and the second direction; and a power storing mechanism disposed in a first power transmission path and in a different second power transmission path between the actuating member and the movable member for storing forces directed from the actuating member toward the movable member in a first force direction and from the actuating member toward the movable member in a second force direction, wherein the first force direction is different from the second force direction;

*wherein the power storing mechanism is disposed in at least one of the first power transmission path or the second power transmission path downstream of the pivot shaft from the pivot shaft toward the movable member when the pivot shaft is rotated.*

23. A rear derailleur apparatus for a bicycle comprising:

a base member for attaching the rear derailleur to the bicycle;

a movable member for supporting a chain guide;

a linkage mechanism coupling the base member to the movable member so that the movable member is capable of movement relative to the base member;

*wherein the linkage mechanism is moved by rotating a pivot shaft;* an actuating member operatively coupled to the linkage mechanism, wherein moving the actuating member in a first direction causes the movable member to move laterally toward a rear wheel of the bicycle and moving the actuating member in a second direction causes the movable member to move laterally away from the rear wheel of the bicycle;

a motor that electrically drives the actuating member in the first direction and the second direction; and a power storing mechanism disposed in a first power transmission path and in a different second power transmission path between the actuating member and the movable member for storing forces directed from the movable member toward the actuating member in a first force direction and from the movable member toward the actuating member in a second force direction, wherein the first force direction is different from the second force direction;

*wherein the power storing mechanism is disposed in at least one of the first power transmission path or the second power transmission path downstream of the pivot shaft from the pivot shaft toward the movable member when the pivot shaft is rotated.*

*24. The derailleur according to claim 6 wherein the second biasing element is disposed in the second power transmission path downstream of the pivot shaft when the pivot shaft is rotated.*

* * * * *